US007155056B2

(12) United States Patent  (10) Patent No.: US 7,155,056 B2
Andersen  (45) Date of Patent: Dec. 26, 2006

(54) METHOD OF SEGMENTATION OF A DIGITAL IMAGE AND A METHOD OF CONTROLLING AN IMPLEMENT

(75) Inventor: Hans J Andersen, Hjallerup (DK)

(73) Assignee: ECO-Dan A/S, Kvistgaard (DK)

( * ) Notice: Subject to any disclaimer, the term of this patent is extended or adjusted under 35 U.S.C. 154(b) by 731 days.

(21) Appl. No.: 10/275,293

(22) PCT Filed: May 3, 2001

(86) PCT No.: PCT/DK01/00307

§ 371 (c)(1),
(2), (4) Date: Nov. 4, 2002

(87) PCT Pub. No.: WO01/82679

PCT Pub. Date: Nov. 8, 2001

(65) Prior Publication Data

US 2003/0147100 A1  Aug. 7, 2003

(30) Foreign Application Priority Data

May 3, 2000  (DK)  ............................... 2000 00728

(51) Int. Cl.
*G06K 9/34* (2006.01)
*G06K 9/62* (2006.01)
(52) U.S. Cl. ...................................... 382/164; 382/224
(58) Field of Classification Search ................ 382/164, 382/224
See application file for complete search history.

(56) References Cited

U.S. PATENT DOCUMENTS 5,224,176 A    6/1993  Crain
5,442,552 A    8/1995  Slaughter et al.
5,483,066 A    1/1996  Sadjadi et al.

(Continued)

FOREIGN PATENT DOCUMENTS

WO    WO 98/46065    10/1998

OTHER PUBLICATIONS

Chun-Kiat Ong, Takashi Matsuyama, "Robust Color Segmentation Using the Dichromatic Reflection Model," icpr, p. 780, 14th International Conference on Pattern Recognition (ICPR'98)—vol. 1, 1998.*

(Continued)

*Primary Examiner*—Samir Ahmed
*Assistant Examiner*—Utpal Shah
(74) *Attorney, Agent, or Firm*—Browdy and Neimark, PLLC

(57) ABSTRACT

In connection with the segmenting of a digital image divided into small elements (pixels) and acquired with a camera having several color channels, to discern an object from a background, the daylight locus and the color locus of the camera are, a priori, modeled after to the body reflectance characteristic of the subject. In this way a normal vector (nS) to the daylight locus is determined a priori and for each pixel, the scalar product between a color vector (cf) of the element in the form of the response from the color channels of the camera and the normal vector of the daylight locus is calculated, following which the element is characterized as representing object or background on basis of the calculation result, the elements characterized as objects (1) being assigned one value and the elements characterized as background being assigned a second value. On basis of the segmented image a control signal for an implement (4) is derived.

3 Claims, 1 Drawing Sheet

U.S. PATENT DOCUMENTS

Figure 1:
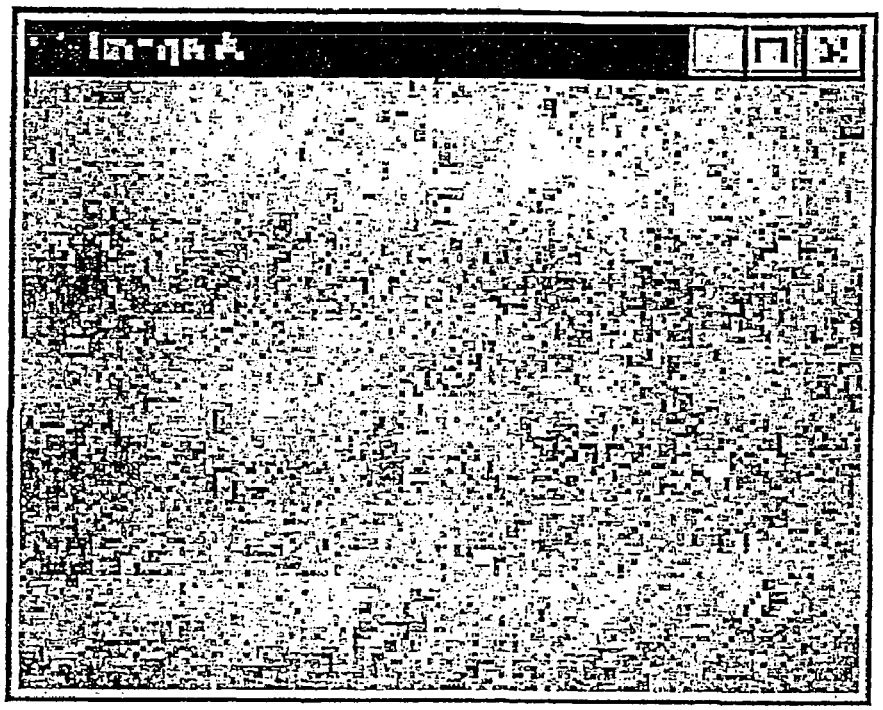

| | | |
|---|---|---|
| 5,862,249 A | 1/1999 | Jang et al. |
| 5,911,669 A | 6/1999 | Stentz et al. |
| 5,968,546 A | 10/1999 | Baur et al. |
| 6,025,790 A | 2/2000 | Saneyoshi |
| 6,053,268 A | 4/2000 | Yamada |
| 2003/0095704 A1* | 5/2003 | Risson ....................... 382/162 |

OTHER PUBLICATIONS

Andersen et al., "A Model Based, Daylight And Chroma Adaptive Segmentation Method", from *Polarization and Color Techniques in Industrial Inspection*, vol. 3826, ed. Marszalec et al., pp. 136-147 (May 3, 1999).

* cited by examiner

METHOD OF SEGMENTATION OF A DIGITAL IMAGE AND A METHOD OF CONTROLLING AN IMPLEMENT

The present invention relates to a method of segmenting a digital image divided into small elements (pixels) and acquired with a camera having several colour channels, to discern an object from a background, in which, a priori, the daylight locus and the colour locus of the camera are modelled after the body reflectance characteristic of the object.

The invention further relates to a method of controlling an implement, in particular an agricultural implement.

It is known, at least it is an expressed wish to be able to, to take pictures of crop in a field and to control an implement in consideration of the crop, a computer processing the pictures and providing control signals for the implement. An example is described in U.S. Pat. No. 5,442,552, which describes a cultivator automatically positioned relative to a centre line of a row of plants by means of a digital image of the row of plants. The image is digitalized in that a diagram of likely colours is drawn up and colour vectors from pixels in the image are assessed relative to the diagram, following which pixels are classified plant/not plant according as the colour vectors fall within or outside the diagram. A problem of this method is, however, that the colours vary according to the illumination, which outdoors (daylight) is not constant. Therefore, such a method will at some times give correct results and at other times incorrect and unusable results.

U.S. Pat. No. 5,483,066 describes a system for recognizing plants by use of a polarization sensitive infrared detector.

U.S. Pat. No. 5,911,669 and WO-A-98/46065 describe segmentation of an electronically scanned image and the provision of control signals for an agricultural implement on basis of the image.

U.S. Pat. No. 6,025,790 and U.S. Pat. No. 6,053,268 relate to control of vehicles in accordance with an image of the road and its white stripes.

The invention aims in particular at making it possible to separate "green" live vegetative material in a field from the background, i.e. the surface of the soil. However, the invention is not limited to use in connection with vegetative material.

Consequently, by way of example a method for segmentation of digital images is described for separation of "green" live vegetative material from a given background.

The method is based on a physical modelling of the image forming process including modelling of: camera sensitivity, reflectance characteristics of "green" vegetation and use of the daylight standard of the Commission Internationale de l'Eclairage (CIE) (Colorimetry. Technical Report 2nd Edition, Commission Internationale de l'Eclairage (CIE), 1986), and the assumption that reflection from the vegetation follows the dichromatic reflection model under the neutral interface assumption.

Modelling of the Image Forming Process

The image forming process in a camera takes place by spectral integration, which for a given spatial location (x,y) in the image plane, illuminated by a light source having a given correlated colour temperature (CCT), is described by the following:

$$C_f(CCT,x,y) = m(\Theta) \int E(CCT,x,y,\lambda) \rho(x,y,\lambda) \tau_f(\lambda) d\lambda \quad (1)$$

in which:

$C_f(CCT,x,y)$: is a vector of dimension f, the elements of which contain the spectral response of channel f. The vector is termed "the colour vector" of locus (x,y) in the image plane. In a standard colour camera, the vector has the dimension 3 corresponding to a response in the red, green and blue channels of the camera.

$E(CCT,x,y,\lambda)$: designates the light source for spatial location (x,y). This is described by means of its correlated colour temperature CCT and modelled in accordance with the method stated in Commission Internationale de l'Eclairage (CIE) standard of daylight (see above).

$\rho(x,y,\lambda)$: is the reflection of spatial location (x,y) in the image plane.

$\tau_f(\lambda)$: is the spectral sensitivity of channel f of the camera (for a standard colour camera there will be 3 channels corresponding to a red, a green and a blue sensitivity), i.e. the characteristics of the camera.

$m(\Theta)$: is a geometrical scaling factor depending on the photometric angles (Θ): incident light angle i, outgoing angle of reflection j and the phase angle g between i and j.

Modelling of the Vegetation Reflection

The reflection of the vegetation is described by means of the dichromatic reflection model giving the reflection as a sum of the surface and body reflections of the vegetation. This implies that a given colour vector $C_f(CCT,x,y)$ of spatial location (x,y) in the image plane is expressed by:

$$C_f(CCT, x, y) = m_B(\Theta) \int E(CCT, x, y, \lambda) \rho_B(x, y, \lambda) \tau_f(\lambda) d\lambda + \quad (2)$$
$$m_S(\Theta) \int E(CCT, x, y, \lambda) \rho_S(x, y, \lambda) \tau_f(\lambda) d\lambda$$

By equation (2) the reflection of the vegetation from spatial location (x,y) in the image plane is divided into two components:

First component denotes the contribution from the body reflection of the vegetation resulting from spectral integration as stated in equation (1), but with the reflectance $\rho(x,y,\lambda)$ modelled according to the characteristics stated in "H. J. Andersen, C. M. Onyango and E. Granum. A model based, daylight and chroma adaptive segmentation method. In EOS/SPIE Conference on Polarisation and Color Techniques in Industrial Inspection, June 1999", to which reference is made. The response of the camera to the body reflection is in this publication called "colour locus". The body reflection is, popularly put, a reflection which takes place below the surface of a given object, whereby a part of the incident light is absorbed by the object. In this way the body reflection imparts the object its colour.

The second component designates the contribution from the surface reflection of the vegetation, which results from spectral integration as stated in equation (1). Under the neutral interface assumption, the reflectance of the surface reflection may be fixed at a constant, viz. 1, following which the response of the camera to the surface reflection will correspond to the response of the camera to the light source, termed the daylight locus of the camera. Parts of the surface of an object which "yield" surface reflection in the direction of a viewer will thus to the viewer appear "white", if the light of the light source is conceived as white.

These modellings are known per se from the aforementioned "H. J. Andersen, C. M. Anyango and E. Granum. A model Based, daylight and chroma adaptive segmentation method. In EOS/SPIE Conference on Polarisation and Color Techniques in Industrial Inspection, June 1999", to which reference is made. According to this reference, an image is segmented in that daylight locus and colour locus are being transformed into a space defined by two out of three colour cromatives and the intensity, following which the colour vector of each individual pixel during segmentation of an image is to be normalized, i.e. reduced to unit length, which from a calculation point of view is a very lourd process, and, consequently, a protracted process.

The object of the present invention is to provide a method of segmenting an image which does not suffer from this drawback. It is furthermore the object of the invention to provide a method, which is suited for implementation in digital signal processor (DSP) systems.

This object is met by a method of the kind mentioned by way of introduction, said method being characterized in that, a priori, a normal vector ($n_S$) to the daylight locus is determined and that for each small element, the scalar product between a colour vector ($C_f$) of the element in the form of the response from the colour channels of the camera and the normal vector ($n_S$) to the daylight locus is calculated, following which the element is characterized as representing object or background on basis of the calculation result, the elements characterized as objects being assigned one value and the elements characterized as background being assigned a second value.

According to a preferred embodiment, the segmented image is weighted thereby that the elements characterized as objects are assigned a value between the first and the second values depending on the distance of their colour vector ($C_f$) from the colour locus.

It is a further object of the invention to provide an improved possibility of controlling an implement, such as an agricultural implement, on the basis of a digital image. This is attained by the method stated in claim 3.

Figure 2:
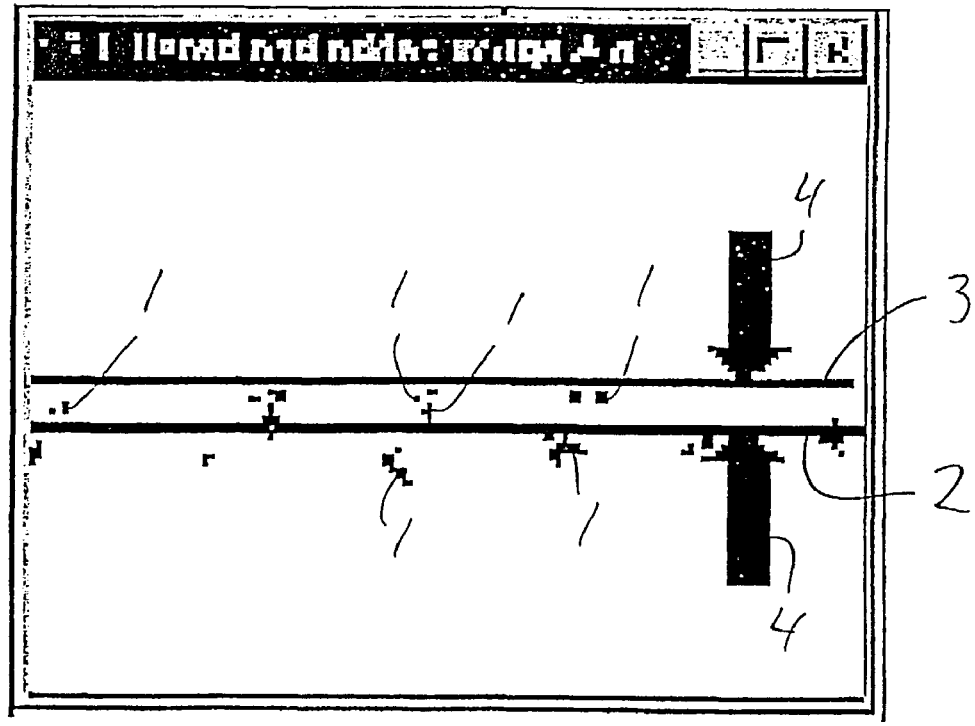

The invention will be described in detail in the following by means of embodiments and with reference to the drawings, in which FIG. 1 shows a computer screen with a colour image of the surface of a field, shown in black/white, and FIG. 2 shows a computer screen with the same image but segmented by means of the method according to the invention.

According to equation (2) a given colour vector will be placed between the vectors from pure body reflection and pure surface reflection, i.e. first and second terms of equation (2).

Numerically equation (2) is approximated by:

$$C_f(CCT, x, y) = m_B(\Theta) \sum_{\lambda=\lambda_a}^{\lambda_b} E(CCT, x, y, \lambda)\rho_B(x, y, \lambda)\tau_f(\lambda)\Delta(\lambda) + m_S(\Theta) \sum_{\lambda=\lambda_a}^{\lambda_b} E(CCT, x, y, \lambda)\rho_S(x, y, \lambda)\tau_f(\lambda)\Delta(\lambda) \quad (3)$$

The interval from $\lambda_a$ to $\lambda_b$ is divided into $\Delta\lambda$ intervals of 1 nm centred about $\lambda$. Each of the two terms in equation (3) (body and surface reflection) is modelled from 300 nm to 830 nm and from a correlated colour temperature from 4000 Kelvin to 25000 Kelvin after the 58 intervals stated in "Colorimetry. Technical Report 2nd Edition, Commission Internationale de l'Eclairage (CIE), 1986", in which the values of $E(CCT,\lambda)$ are found. By the modelling, matrices $\Gamma$ and $Y$ are collected for each of the terms, said matrices containing the sum of first and second terms, i.e. the body reflection and the surface reflection of the vegetation. Consequently, $\Gamma$ and $Y$ get the dimensions 58×f, in which f corresponds to the number of channels of the camera. $\Gamma$ thus contains 58 modelled colour vectors for pure body reflection and $Y$ contains 58 modelled daylight vectors.

As will appear from the following, the vectors $\Gamma$ and $Y$ will, in the practical examples, be normalized, i.e. reduced to unit length, by the subsequent calculations, for which reasons the contribution from $m_S(\Theta)$ and $m_B(\Theta)$ are eliminated. Therefore, these two factors can, when calculating the terms in the two matrices be set as equal to 1. $\rho_S$ is as mentioned above equal to 1. $\rho_B(\lambda)$ is determined experimentally in respect of the actual type of object. $\tau_f(\lambda)$ is the characteristics of the camera and information thereon can be obtained from the manufacturer of the camera in question.

In practice, the camera will usually have two or three channels, and these two conditions will therefore be discussed in detail in the following.

In case of two channels, the colour locus and the daylight locus in a two-dimensional system of coordinates with axes corresponding to the two colour channels will be represented by the vectors in the two matrices departing from origo, the vectors from the two matrices being positioned approximately on their respective line of two straight lines: a "colour line" for the body reflection and a "daylight line" for the surface reflection. The colour line represents the colour locus and the daylight line represent the daylight locus. The two loci (lines) are determined by mean value calculation or a similar, known calculation method which minimizes deviations of the individual vectors.

In case of three channels, the colour locus and the daylight locus in a three-dimensional system of coordinates with axes corresponding to the three colour channels (normally channels for red, green and blue sensitivity) will be presented by the vectors of the two matrixes departing from origo, the vectors from the two matrixes lying approximately in their respective plane of two planes: a "colour plane" for the body reflection and a "daylight plane" for the surface reflection. The colour plane represents the colour locus and the daylight plane represents the daylight locus. The two loci (planes) are determined by a suitable, known calculation method, which minimizes deviations for the individual vectors.

By segmentation of a given image, pixel by pixel, a given pixel will have a colour vector $C_f$ which will be positioned somewhere in relation to the colour locus and the daylight locus.

The invention resides in the realization/recognition that a pixel representing a plant cannot have a colour vector $C_f$ positioned on the distant side of the daylight locus relative to the colour locus. Therefore, a pixel with a colour vector $C_f$ lying in the daylight locus or farther away from the colour locus is characterized as non-plant or background, whereas pixels having colour vectors $C_f$ lying on the "green side" or the colour locus side of the daylight locus are characterized as plant. This is calculated thereby that a normal vector $n_S$ to the daylight locus oriented towards the colour locus is determined and the scalar product or the dot product between the normal vector $n_S$ and the colour vector $C_f$ is calculated. If the dot product is equal to or smaller than zero, the pixel is assigned the value 0 for background, and if the dot product is higher than 0, the pixel is assigned value 1 for plant.

As there is some uncertainty in respect of whether pixels with colour vector $C_f$, which is close to the daylight locus, actually represent a plant or not (a stone in the field would also result in a similar surface reflection), the segmented image can be weighted thereby that the distance of the colour vector $C_f$ of a pixel, which is characterized "plant", to the colour locus is determined, and the pixel is assigned a value which corresponds to this distance, such that the pixel is assigned the value 1, if the colour vector $C_f$ lies in the colour locus, and a smaller value, proportional to the distance to the colour locus, if the colour vector $C_f$ does not lie therein.

This is described in detail in the following.

Segmentation in Accordance with the Daylight Locus of the Camera f=2

For f=2 a given image is segmented according to the modelled daylight locus of the camera by first normalizing Γ and Y for each row acording to the second norm such that all row vectors constitute unit vectors. In this way the contributions from $m_B(\theta)$ and $m_S(\theta)$ are eliminated, for which reason these factors are at the calculation of the elements Γ and Y set=1.

The mean vectors $m_B$ and $m_S$ of the normalized Γ and Y matrices are determined. Then, a line with the transverse vector $\hat{m}_S$ of $m_S$ as normal vector $n_S$ and intersection through (0.0) is determined. The normal vector $n_S$ is then adjusted to have a positive direction towards the side where the line with a normal vector corresponding to the transverse vector $\hat{m}_B$ of $m_B$ and intersection through (0.0) is positioned in 1st quadrant.

A given pixel in a given image with the colour vector C(x,y) is now classified as vegetation, if its dot product with $n_S$ is bigger than zero and as non-plant, if its dot product with $n_S$ is smaller than or equal to zero.

This is expressed as follows, in which g(x,y) represents the segmented image:

$$g(x, y) = \begin{cases} 0 & C(x, y) \cdot n_s \leq 0 \\ 1 & C(x, y) \cdot n_s > 0 \end{cases} \quad (4)$$

f=3

For f=3 a given image is segmented in accordance with the daylight locus of the camera first by normalizing Y for each row according to the second norm such that all row vectors constitute unit vectors. Then those two row vectors in Y are found that minimize the triple scalar product of:

$$\min \left| (M_{S,CCT_i} \times M_{S,CCT_j}) \cdot M_{S,mean} \right| = \quad (5)$$

$$\min \begin{Vmatrix} M_{S,CCT_i,1} & M_{S,CCT_j,1} & M_{S,mean,1} \\ M_{S,CCT_i,2} & M_{S,CCT_j,2} & M_{S,mean,2} \\ M_{S,CCT_i,3} & M_{S,CCT_j,3} & M_{S,mean,3} \end{Vmatrix}$$

in which $M_{S,CCT_i}$ and $M_{S,CCT_j}$ are two row vectors in Y with i≠j. $M_{mean}$ is the mean vector of the remaining row vectors in Y.

The two row vectors in Y minimizing equation (5) are found, and on basis thereof $n_S$ is calculated as a cross product between them:

$$n_S = M_{S,CCT_i} \times M_{S,CCT_j} \quad (6)$$

The signs of the elements in $n_S$ are chosen such that pixels containing vegetation get a positive value of the dot product between $n_S$ and a given colour vector C with spatial locality (x,y) in the image plane.

A given pixel in a given image with the colour vector C(x,y) is now classified as vegetation if its dot product with $n_S$ is bigger than zero and as non-vegetation if its dot product with $n_S$ is smaller than or equal to zero.

This is expressed in the following, g(x,y) being the segmented image:

$$g(x, y) = \begin{cases} 0 & C(x, y) \cdot n_s \leq 0 \\ 1 & C(x, y) \cdot n_s > 0 \end{cases} \quad (7)$$

Weighting Vegetation Pixels f=2

All pixels classified as vegetation are now weighted in respect of their distance to the modelled vegetation reflection locus (colour locus).

The matrix Γ is normalized for each row according to the second norm, such that all vectors constitute unit vectors. The mean vector $m_1$ of Γ is determined and the line with the transverse vector $\hat{m}_1$ of $m_1$ as normal vector $n_B$ and intersection through (0.0) is determined.

A weighted image is now calculated by weighting pixel points classified as vegetation relative to their distance to the modelled vegetation locus (colour locus)

This is expressed in the following, in which g(x,y) is the segmented image:

$$g(x, y) = \begin{cases} 0 & C(x, y) \cdot n_S \leq 0 \\ 1 - \left| \frac{C(z, y) \cdot n_B}{\|C(x, y)\|} \right| & C(x, y) \cdot n_S > 0 \end{cases} \quad (8)$$

f=3

All pixels classified as vegetation are now weighted relative to their distance to the plane, which minimizes the absolute error of all row vectors normalized to unit vectors contained in Γ.

Γ is normalized for each row according to the second norm, such that all row vectors constitute unit vectors. Then those two row vectors in Γ are found that minimize the triple scalar product of:

$$\min \left| (H_{B,CCT_i} \times H_{B,CCT_j}) \cdot H_{B,mean} \right| = \quad (9)$$

$$\min \begin{Vmatrix} H_{B,CCT_i,1} & H_{B,CCT_j,1} & H_{B,mean,1} \\ H_{B,CCT_i,2} & H_{B,CCT_j,2} & H_{B,mean,2} \\ H_{B,CCT_i,3} & H_{B,CCT_j,3} & H_{B,mean,3} \end{Vmatrix}$$

in which and $H_{B,CCT_i}$ and $H_{B,CCT_j}$ are two row vectors in Γ with i≠j. $H_{mean}$ is the mean vector of the remaining row vector in Γ.

The two row vectors in Γ which minimize equation (9) are found, and on basis thereof, $n_B$ is calculated as a cross product between these vectors:

$$n_B = H_{B,CCT_i} \times H_{B,CCT_j} \quad (10)$$

$n_B$ is normalized according to the second norm.

A weighted picture is now calculated by weighting pixel points classified as vegetation in respect of their distance to the modelled plane derived from the body reflection of vegetation (colour locus).

This is expressed in the following, in which g(x,y) is the segmented image:

$$g(x, y) = \begin{cases} 0 & C(x, y) \cdot n_S \leq 0 \\ 1 - \left| \dfrac{C(x, y) \cdot n_B}{\|C(x, y)\|} \right| & C(x, y) \cdot n_S > 0 \end{cases} \quad (11)$$

It is thus possible, by means of the method described, firstly to segment an image by means of the daylight locus of the camera and then to weight the remaining pixel points thereof on basis of their distance from a modelled locus (colour locus) in accordance with the reflectance characteristics of "green" vegetation.

FIG. 1 shows a picture of a field with young plants in a row acquired by means of a camera placed on an agricultural implement or a tractor. The figure is a black/white representation of a colour image and the green plants have actually "disappeared" from the soil-brown background by the conversion from colour into a black/white image.

FIG. 2, however, shows the same image segmented by means of the method described above. Here, the young plants appear as distinct, bigger and smaller, black spots 1 on a white background. A centre line 2 has been inscribed for the row of plants 1, the centre line 2 being calculated by means of a method known per se on basis of the segmented image. Furthermore, a centre line 3 of the screen has been inscribed corresponding to the desired positioning of the centre line 2 relative to the camera and consequently the agricultural implement or the tractor. There is thus a difference between the position of the agricultural implement or the tractor relative to the row of plants as indicated by means of two arrows 4. To eliminate this difference, a control signal is established in a manner known per se by means not shown, and the control signal is in a conventional manner sent to control means (not shown) to control the tractor or the agricultural implement to guide the tractor and/or the agricultural implement to the desired positioning relative to the row of plants. It is also possible to control for instance a spraying device to spray on the individual plants in the image, as is per se described in the prior art, for instance in WO-A-95/26622.

Though the invention has been explained by means of embodiments, it should be understood that it is not limited to the scope of these embodiments. Images of other objects on other backgrounds than plants in a field may be segmented by means of the invention.

The invention claimed is:

1. A method of segmenting a digital image divided into small elements (pixels) and acquired with a camera having several colour channels, to discern an object from a background, in which method, a priori, a daylight locus and a colour locus of the camera are modelled in a space defined directly by the colour channels of the camera, a daylight locus being the response of the camera to a standard daylight of varying correlated colour temperature (CCT), and the colour locus being modeled after body reflectance characteristics of the object under conditions of said standard daylight, wherein, a priori, a normal vector ($n_s$) to the modelled daylight locus is determined and for each small element, the scalar product between a colour vector ($C_f$) of the element in the form of the response from the colour channels of the camera and the normal vector of the daylight locus is calculated, following which the element is characterized as representing object or background on basis of the calculation result, the elements characterized as objects being assigned one value and the elements characterized as background being assigned a second value.

2. A method according to claim 1, wherein the elements characterized as object are assigned a value between the first and the second values depending on the distance of their colour vector ($C_f$) from the colour locus.

3. A method of controlling an implement, in particular an agricultural implement, in which a control signal for the implement is derived from a segmented digital image, wherein the image is segmented by the method according to claim 1 or 2.

* * * * *